March 10, 1970     O. C. MARKHAM ET AL     3,499,623

PARACHUTE-PROTECTED AIRCRAFT

Filed April 2, 1968     2 Sheets-Sheet 1

INVENTORS
Odell C. Markham
Alan C. Ferguson
BY
AGENT

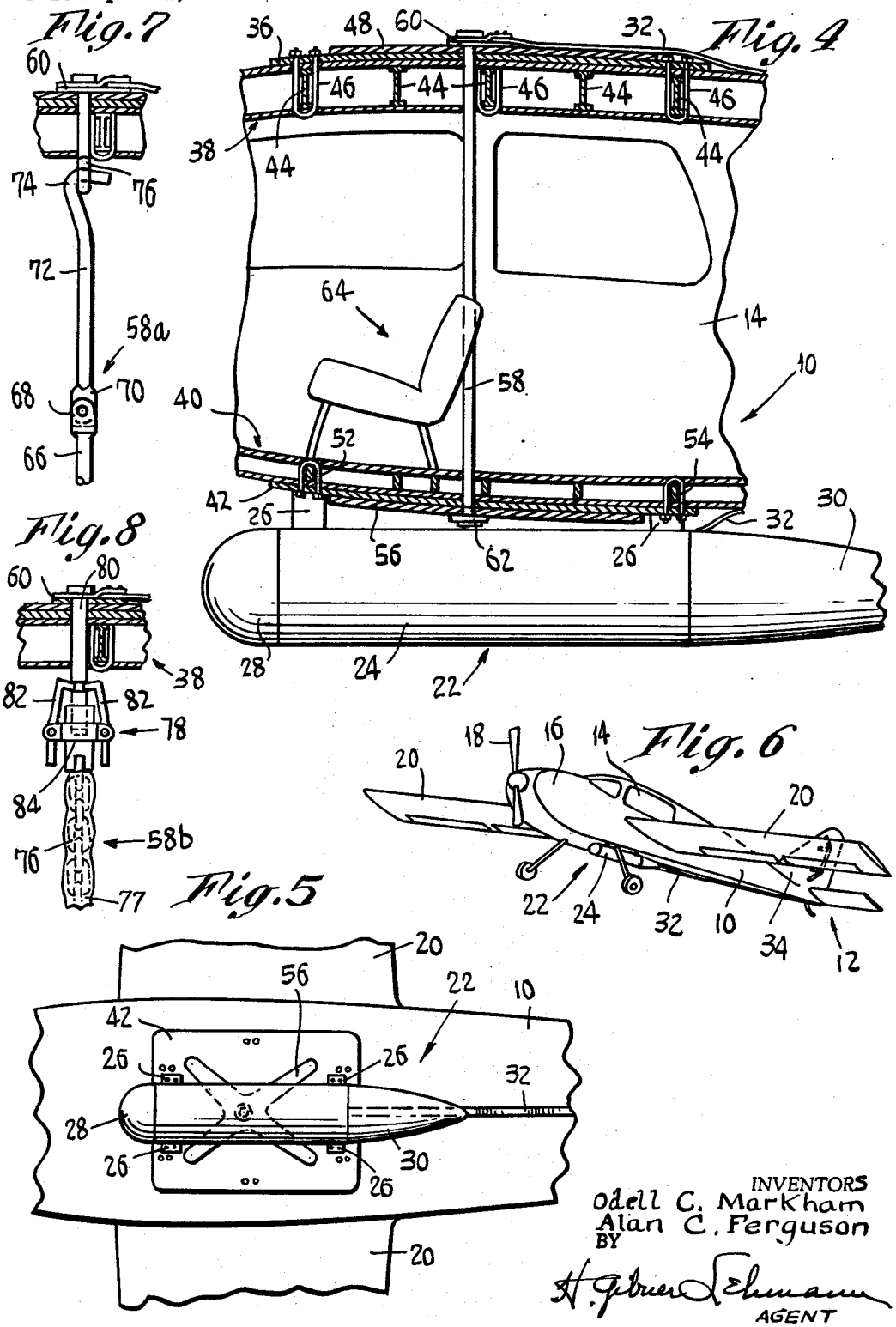

United States Patent Office 3,499,623
Patented Mar. 10, 1970

3,499,623
PARACHUTE-PROTECTED AIRCRAFT
Odell C. Markham, 247 Colorado Ave., Bridgeport, Conn. 06605, and Alan C. Ferguson, Perry Ave., Norwalk, Conn. 06850
Filed Apr. 2, 1968, Ser. No. 718,035
Int. Cl. B64d 17/80
U.S. Cl. 244—139                                    11 Claims

ABSTRACT OF THE DISCLOSURE

A parachute-protected aircraft having a fuselage and a normally folded parachute connected to the top of the fuselage by a long tethering rope. The top and bottom of the fuselage are interconnected by a vertical strut passing through the central fuselage area. The strut has a substantially direct connection with the tethering rope whereby forces imposed by the latter on the aircraft are applied to both the fuselage top and the fuselage bottom or floor.

CROSS REFERENCES TO RELATED APPLICATIONS

Copending application of Odell C. Markham and Alan C. Ferguson, Ser. No. 616,672 filed Feb. 16, 1967, now Patent No. 3,395,881, and entitled "Parachute Protected Aircraft."

PERTINENT PRIOR ART

BACKGROUND

This invention relates to heavier-than-air craft of the type equipped with parachutes to provide for safe descent of the craft in an emergency.

In our identified copending application there is disclosed an outboard parachute carried below the fuselage and connected to the top of the latter by a long tethering cord or web which extends backward and forward along top and bottom exterior surfaces thereof and around the tail section. At the fuselage top the tether is secured to a force-distributing plate of relatively large area, which in turn transmits forces to lower fuselage portions by sturdy encircling straps or webs on the fuselage exterior. In an emergency opening of the parachute the initial stresses or pulls of the tether can be of great magnitude, so that for the sake of safety an adequate force distribution should be had when considering the craft, especially the cabin or cockpit. Such distribution might not be had where the anchor plate is merely attached to the top or roof of the cabin, without the use of encircling straps. In some circumstances the encircling straps, however, would meet with objection from various sources.

The foregoing problems are solved and obviated by the present invention, and one object of the invention is to provide a novel and improved parachute-protected aircraft and parachute anchorage means which obviates the encircling straps and yet provides a simple and effective stress or force distribution means for the parachute tether. This is accomplished by the provision of a pair of anchor plates, one at the top and one at the bottom of the fuselage or cabin, and by an upright strut extending through the cabin space, preferably between the seats therein, and connecting the anchor plates to each other. The strut has a substantially direct connection with the tether line whereby the forces imposed thereby on the aircraft are distributed and shared by both the roof structure and floor structure of the cabin or fuselage.

Other objects and advantages of the invention reside in an improved tether line anchorage as above set forth, which is especially simple yet strong, sturdy and failure-resistant; an anchorage wherein the strut or the means is capable of being folded or moved to a temporary retracted position so as to provide clearance for the movement of luggage or other objects; a parachute anchorage as above, which is readily installed in existing aircraft without extensive alteration; and an improved anchorage means of the kind set forth, which is compact, light in weight, and economical to fabricate and install.

Other features and advantages will hereinafter appear.

In the drawings:

FIG. 4 is a fragmentary vertical sectional view through the central portion of the fuselage at the center of gravity of the aircraft, illustrating a tie-rod device provided by the invention for connecting central portions of the floor and roof.

FIG. 5 is a fragmentary bottom plane view of the central portion of the aircraft fuselage, illustrating the underslung, packaged and enclosed outboard parachute.

FIG. 6 is a front perspective view of a parachute-protected low-wing type aircraft.

FIG. 7 is a fragmentary elevational view of an articulated tie rod construction for connecting the floor and roof of the fuselage, constituting another embodiment of the invention.

FIG. 8 is a fragmentary elevational view of still another form of tie-member construction for connecting the roof and floor of the fuselage, constituting yet another form of the invention.

Figure 1:
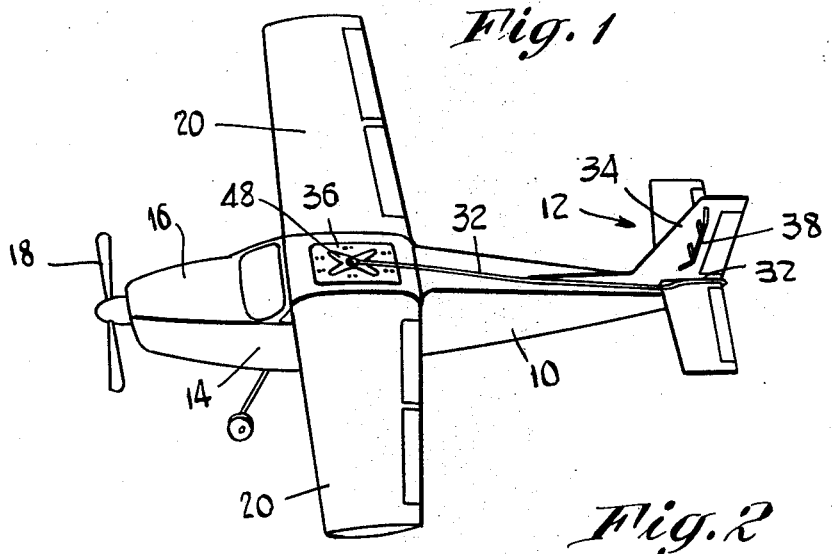
FIG. 1 is a side perspective view of a high-wing aircraft with outboard-parachute protection as provided by the invention, the parachute being carried below the fuselage and having its anchorage at the top central fuselage portion, via a long tethering line.

Referring first to FIGS. 1–5, the parachute-protected aircraft illustrated therein comprises a fuselage 10 having a generally conventional tail structure 12, a cabin portion 14 with engine compartment 16 and propeller 18. The aircraft is of the high-wing type, having main wings 20 connected to the fuselage frame at the roof of the cabin 14. An outboard parachute designated generally by the numeral 22 is carried in a streamlined casing 24 which is slung below the fuselage 10 (or more specifically the cabin 14 thereof), being secured in place by suitable brackets 26. The casing 24 has a rounded nose portion 28 and an elongate tapering or somewhat conical rear portion 30 constituted as a removable cover which can be forcibly ejected or discharged to enable the contained main and pilot parachutes (not shown) to be released.

The main parachute which is carried in the casing 24 is joined to a tethering line which is preferably in the form of a flat web 32 of woven plastics fibers, said web extending backward as shown in FIGS. 2–5 along the underside of the fuselage 10 and being releasably adhered or otherwise secure thereto by suitable means such as a weatherproof adhesive. The web 32 extends upward around the rear edge of the tail structure 12 and is then brought forward along one side of the stabilizer and rudder assemblage 34 and along the top of the fuselage 10, to terminate at an anchorage plate 36 which is secured to the fuselage framework at the roof of the cabin 14 or the central parts of the wings 20 as may be the case. The tethering web 32 is preferably releasably adhered to the top surfaces of the aircraft by a suitable weatherproof adhesive.

Figure 2:
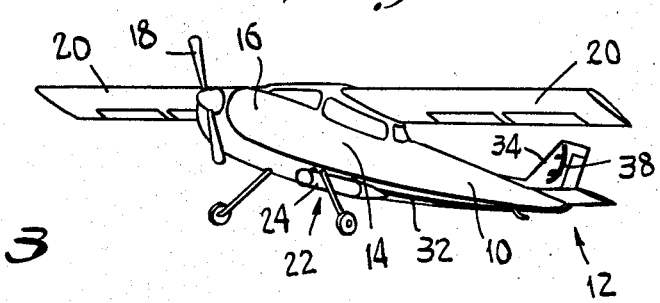
FIG. 2 is a front perspective view of the aircraft of FIG. 1.

As indicated in FIGS. 1 and 2, the stabilizer and rudder assemblage 34 has on its opposite sides curved or bowed guard rails 38 to prevent entanglement of the web 36 with the tail at such time that the parachute in being released causes the tethering line 32 to be torn from its normal location shown in FIGS. 1–4. It will be understood that in the event an emergency landing of the aircraft becomes necessary due to disabling of its engine, or for any other reason, the pilot will discard the casing cover 30 and eject the parachute assemblage from the casing 24. When this is done the pilot chute will open first and then insure the complete fast removal of the main chute from the casing. The released chutes, being swept into the air stream, will open after passing rearward under the fuselage 10. This will tear loose the portions of the tethering line which are adhered to the bottom and top of the fuselage 10, and since the line is secured to the anchor plate 36 the lifting effect of the parachutes will be exerted on the aircraft, breaking the descent and resulting in a landing which is relatively safe.

In accordance with the present invention, improved means are provided for anchoring the end of the tethering line 32 to the aircraft, specifically to the fuselage 10 thereof, such means effecting a securement of the line not only to the roof portion 38 of the aircraft fuselage, but also to the floor portion 40 thereof. Referring to FIGS. 1 and 3–5, the improved anchorage comprises not only the top anchor plate 36 which is secured to the upper portion of the aircraft above the center of gravity thereof, but also a bottom anchor plate 42 which is secured under the floor structure 40 of the fuselage. The plates 36 and 42 are shown as being rigidly fastened to members of the fuselage and/or wing frame structure so as to insure against pull-out or failure at the time that the main parachute is initially jerked fully opened.

Referring to FIG. 4, the main wing spars are designated 44, and the upper anchorage plate 36 is shown as secured to said spars by U-bolts 46. A strengthening spider 48 in the form of an X is secured as by welding or riveting to the top of the anchor plate 36, so as to distribute stresses substantially over the entire area thereof. A similar construction is followed under the floor 40 of the aircraft fuselage. Here, at the exterior, there is mounted the bottom anchorage plate 42, preferably by U-bolts 52 passing around frame members 54 in the floor 40. The bottom anchor plate 42 also has a reinforcing and force-distributing spider 56, and as seen in FIG. 5 the brackets 26 for the parachute casing 24 may be fastened to the plate 42.

By the present invention, the top and bottom anchor plates 36, 42 are tied or coupled to each other by a vertical tie member or rod 58 which passes through the roof 38 and floor 40 and through, and is secured as by welding to, bearing plates 60, 62 disposed respectively on the spiders 48, 56. The bearing plates 60, 62 may be welded to the spiders 48, 56 which may be welded to the anchor plates 36, 42. The bearing plates 60, 62 also serve to distribute forces between the tie rod 58 and the spiders and anchor plates. The rod 58 may conveniently extend upward between the rear portions of a pair of side-by-side cabin seats 64, as shown in FIG. 4.

Figure 3:
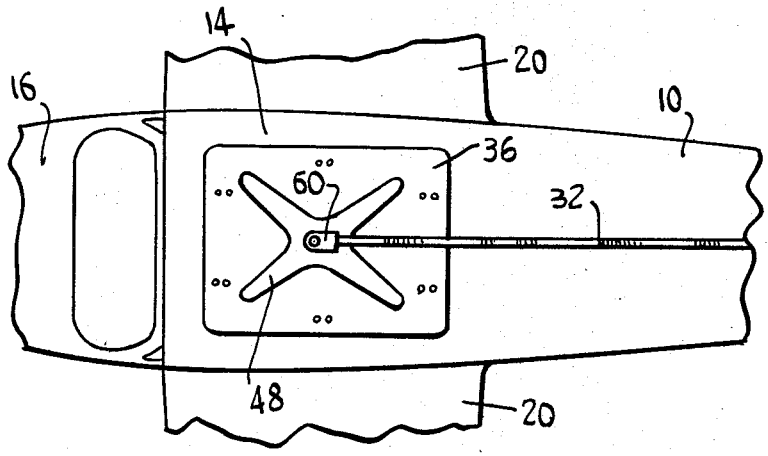
FIG. 3 is a fragmentary top plan view of the central portion of the aircraft in the region of the center of gravity thereof, disclosing the improved anchorage arrangement.

Thus, there is provided by the invention a strong reinforcement and tie between the cabin roof 38 and floor 40, whereby the aircraft frame structure is coupled together at the center of the fuselage, said reinforcement and tie constituting a powerful and secure anchorage to which the tethering line 32 is attached. Referring to FIGS. 3 and 4, the line 32 may be secure to the top bearing plate 60 in any approved manner, as by clamps, rivets and the like. As a consequence of the above construction, at the instant of greatest stress when the main parachute is being jerked open, there is prevented any likelihood of failure of the anchorage means and disruption of the fuselage, regardless of the weight of the contents of the same, particularly the passengers in the cabin 14.

A modified form of tie rod or strut which is articulated, is illustrated in FIG. 7. Here, the rod 58a is formed of a lower part 66 having a bifurcated pivot knuckle 68 in which there is received an apertured lug 70 of an upper tie rod part 72 having a hook portion 74 received in an eye bolt 76 which passes through and is secured to a top bearing plate 60. With such construction, the tie rod 58a may be temporarily disconnected from the roof if it should be desired to have clearance space during moving of equipment, baggage and the like, as well as during movement of passengers.

In place of the rigid tie rod 58, a flexible tie means in the form of a steel chain 58b shown in FIG. 8 may be employed, such chain being preferably covered by a plastic sleeve 77 and being secured to a quick connect and disconnect fitting 78 which in turn is attached to the top bearing plate 60. The fitting 78 may comprise a stud 80 having an annular groove which is engaged by hooks 82 pivoted on a collar 84. It will be understood that other forms of tie members may be utilized, and that in its broadest aspects, the invention embraces the provision of means for tieing together the roof and floor of an aircraft fuselage, such means constituting an anchorage to which a parachute may be tethered for the purpose of enabling safe emergency landings of the aircraft to be effected.

Whether the aircraft is of the low-wing type illustrated in FIG. 6, or of the high-wing type as illustrated in FIGS. 1 and 2 will not impair the effectiveness and adaptability of the invention, as can be readily understood. In the case of the low-wing aircraft of FIG. 6, the tie rod 58 would connect the anchorage plate on the roof of the cabin with the anchorage plate under the cabin 4, exactly as has been described above.

Where the rod 58 is rigid it will carry both tensile and compressive stresses, thus preventing simultaneous inward movements of the roof and floor and minimizing relative vibrations, as well as bracing against pull forces on the web 32. By shortening the rod 58 slightly to make a force fit, the effect will be had by clamping the fuselage 10 between the anchor plates 36, 42, and this action can be used as a supplement to actual securement of the individual plates, enabling a simplification of the securement to be had.

Figure 9:
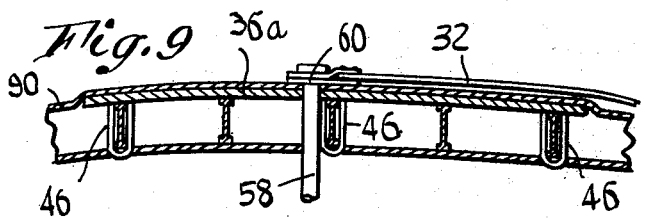
FIG. 9 is a fragmentary vertical section through the roof of an aircraft fuselage, illustrating yet another form of the invention.

The upper anchorage plates, designated 36a in FIG. 9, may be disposed below the top skin 90 of the aircraft by first laying open the skin to expose underlying framework. Thereafter the skin 90 is secured in place as a covering for the anchor plate.

It will now be understood from the foregoing that we have provided a novel and improved, especially simple yet effective anchorage means by which a tethered emergency parachute may be securely fastened to an aircraft to enable the later to withstand the strong pull when the main chute is jerked open upon its initial opening. The improved anchorage means distributes the force and stress of the pull of the frame structure of the fuselage, both in the cabin roof and cabin floor, and also (as seen in FIG. 4) to the wing girders where these pass through the fuselage.

Variations and modifications are possible, and portions of the improvement may be used without others.

We claim:

1. A parachute-protected aircraft comprising, in combination:
    (a) an aircraft having a framework and including a fuselage cabin,
    (b) a parachute,
    (c) means releasably carrying the parachute on the aircraft framework for release therefrom,
    (d) an anchorage secured to and disposed at the top of the fuselage cabin in a location substantially adjacent and above the center of gravity of the aircraft, (e) a tether rop constituting the sole means operatively securing the parachute to the said anchorage,
(f) a second anchorage secured to the underportion of the fuselage cabin, and
(g) an elongate tensile tie means extending substantially vertically through the space in the interior of the cabin and securely connecting the anchorages to each other, thereby to distribute the stress of a pull on the tether rope between upper and lower portions of the cabin.

2. An aircraft as in claim 1, wherein:
(a) the tie means comprises a rigid rod effecting both a tensile and a compressive connection beween top and underside of the fuselage.

3. An aircraft as in claim 1, wherein:
(a) the tie means comprises a chain and a quick disconnect connection between the chain and top of the fuselage.

4. An aircraft as in claim 1, wherein:
(a) the tie means comprises an articulated strut having a joint intermediate its ends and a separable connection with the top of the fuselage,
(b) the upper portion of said strut being swingable to a lower position to provide clearance in the fuselage for the movement of objects therein.

5. An aircraft as in claim 1, and further including:
(a) anchor plates attached to the top and underside portions of the fuselage cabin, to which plates the tie means are secured.

6. An aircraft as in claim 5, wherein:
(a) the anchor plates are attached to framework of the fuselage comprising said top and underside cabin portions.

7. An aircraft as in claim 6, wherein:
(a) the fuselage has a skin which overlies the upper anchor plate.

8. An aircraft as in claim 6, wherein:
(a) the anchor plates have reinforcing spiders extending over their surfaces.

9. An aircraft as in claim 6, wherein:
(a) bearing plates are disposed against the anchor plates,
(b) said tie means being secured to the bearing plates.

10. An aircraft as in claim 5, wherein:
(a) the parachute is secured to the underside of the aircraft framework, and
(b) the tether rope passes along the top and bottom surfaces of the fuselage, and around the tail portion thereof.

11. An aircraft as in claim 1, wherein:
(a) the fuselage has a pair of seats disposed side by side,
(b) said tie means passing between the said seats.

References Cited
UNITED STATES PATENTS

| | | | |
|---|---|---|---|
| 1,423,611 | 7/1922 | Hayes | 244—139 |
| 1,731,491 | 10/1929 | Grissom et al. | 244—139 |
| 2,018,448 | 10/1935 | Juergens | 244—139 |
| 2,458,212 | 1/1949 | Smith | 244—139 |

MILTON BUCHLER, Primary Examiner

T. W. BUCKMAN, Assistant Examiner